United States Patent
Wong

[19]

[11] Patent Number: 6,085,900

[45] Date of Patent: Jul. 11, 2000

[54] OPTICAL DISC HOLDER

[75] Inventor: Chi Man Wong, Cheung Sha Wan, The Hong Kong Special Administrative Region of the People's Republic of China

[73] Assignee: Concord Continental Ltd., The Hong Kong Special Administrative Region of the People's Republic of China

[21] Appl. No.: 09/256,188

[22] Filed: Feb. 24, 1999

[51] Int. Cl.[7] .................................................. B65D 85/57
[52] U.S. Cl. ..................... 206/308.1; 206/310; 206/493
[58] Field of Search ................................ 206/308.1, 309, 206/310, 311, 312, 493

[56] References Cited

U.S. PATENT DOCUMENTS

| | | |
|---|---|---|
| 4,793,479 | 12/1988 | Otsuka et al. . |
| 5,251,750 | 10/1993 | Gelardi et al. . |
| 5,377,825 | 1/1995 | Sykes et al. . |
| 5,400,902 | 3/1995 | Kaminski . |
| 5,526,926 | 6/1996 | Deja . |
| 5,651,458 | 7/1997 | Brosmith et al. . |
| 5,660,274 | 8/1997 | Chien ................................ 206/308.1 |
| 5,685,425 | 11/1997 | Choi . |
| 5,685,427 | 11/1997 | Kuitems et al. . |
| 5,727,680 | 3/1998 | Liu . |
| 5,788,068 | 8/1998 | Fraser et al. . |
| 5,829,582 | 11/1998 | Ippolito et al. . |

*Primary Examiner*—Paul T. Sewell
*Assistant Examiner*—Nhan T. Lam
*Attorney, Agent, or Firm*—Dinesh Agarwal, P.C.

[57] ABSTRACT

A disc holder for projecting through a central aperture of an optical disc in order to hold the optical disk in place. The disc holder includes a base, a rigid central core, several support arms that extend inwardly from the base to support the central core in spaced relation from the base, and securing means for releasably securing the rigid central core within the central aperture of the optical disc. The securing means includes locking fingers mounted on the central core. The locking fingers are biased outwardly against the edge of the central aperture of the disc when the disc is held by the disc holder. The force of the locking fingers against the edge of the central aperture are movable radially inward to it with the central aperture of the disc helps to hold the disc in place. The locking fingers of the disc, thereby allowing the disc to move over the locking fingers so that the disc can be put on or taken off the disc holder.

8 Claims, 4 Drawing Sheets

OPTICAL DISC HOLDER

FIELD OF THE INVENTION

This invention relates to optical disc storage and more particularly to an optical disc holder, as well s to disc containers incorporating such optical disc holders.

BACKGROUND OF THE INVENTION

The term "optical disc" in the context of this specification refers to laser-readable discs for carrying, for example, prerecorded music, computer software, videos, films, interactive gases, or other data.

Optical discs are conventionally stored in plastic cases when not in use. Such discs typically include a central aperture that is used to both play the disc and to hold the disc in place during storage. Conventional plastic storage cases include a disc-engaging member centrally disposed within the case that projects through the aperture of the disc and secures the disc in place within the case. Such disc-engaging member is typically formed by a plurality of inwardly extending arms that are fixed to the case at their outer ends. At their inner ends, the arms extend upwardly, away from the base portion of the case to which the outer ends of the arms are secured, to form the disc-engaging member that fits within the central aperture of the disc.

In many prior disc holders, such as the disc holder disclosed in U.S. Pat. No. 5,788,068, the disc-engaging member defined by the unstressed arms is too large to fit within the central aperture of the optical disc. To fit the disc-engaging member of such disc holders within the central aperture of the disc, the disc-engaging member is first forced downwardly towards the base. This downward motion of the disc-engaging member bends the plurality of arms, thereby moving the inner ends of the arms closer together and reducing the dimension of the disc-engaging member, which permits the disc-engaging member to fit within the central aperture of the disc. After the pressure is removed from the disc-engaging member, the arms return to their unstressed position, and the disc-engaging member increases in dimension to tightly grip the rim of the central aperture of the disc. In the disc older disclosed in U.S. Pat. No. 5,788,068, as well as in other prior disc holders, the disc-engaging member has a lip defined by the arms curving slightly outwardly. After the pressure is released from the disc-engaging manner of such a prior disc holder, the central aperture of the disc is secured on the disc-engaging member between the of the central aperture and the base.

Prior disc holders such as the disc holder disclosed in U.S. Pat. No. 5,788,068 may suffer from a number of disadvantages stemming from the uneven distribution of force to the arms that define the disc-engaging member. This uneven distribution of force can easily occur as a result of an uncentered downward pressure being applied to the disc-engaging member. This uneven distribution of forces to the arms may have a number of undesirable consequences for both the disc holder and the disc. Specifically, when force is unevenly applied to the areas, some arms may be pushed downwardly towards the base to a sufficient extent to permit the portion of the lip defined by such arms to disengage from the disc. However, other arms may not be forced down sufficiently to disengage the portion of the lip defined by such arms from the disc. The user may nonetheless attempt to remove the disc from the case, resulting in the disc being bent, which may damage the disc and result in loss of information carried on the disc. Alternatively, the user may press down harder but in much the same way in an attempt to release the disc, thereby increasing the wear on the arms of the disc holder.

The uneven application of force to the disc-engaging member may also result in the premature wearing out of the arms that define the disc-engaging member. These arms are particularly subject to wear as a result of being unsupported at one end. Once some of the arms are worn out, the disc holder is essentially worn out as the upwards resilience of the arms is required for the disc holder to continue to function effectively—it is the upward resilience of the arms that secures the disc in place. If force is unevenly distributed among the arms, then it is likely that some arms will wear out long before other arms or other components of the disc holder do. This problem is self-perpetuating, as arms that have previously been subjected to more force may be weaker and may bend more in response to the same force than other arms. Even a force that is evenly applied initially may become uneven as different arms bend to different extent; the force may then be increasingly allocated to the arms that bend more, resulting in still more wear to these arms.

Thus a disc holder that favors the even distribution of the force between different arms and mitigates the uneven wearing of arms is desirable.

SUMMARY OF THE INVENTION

It is an object of an aspect this invention to provide an improved disc holder.

In accordance with one aspect of the invention, there is provided an apparatus for releasably securing an optical disc having a central aperture. The apparatus includes a base, a rigid central core, a plurality of inwardly extending support arms for supporting the rigid central core, and securing means for releasably securing the rigid central core within the central aperture of the optical disc. The rigid central core is dimensioned to fit within the central aperture of the optical disc and is spaced from the base. Each of the plurality of support arms has an associated outer end attached to the base and an associated inner end fixed to the rigid central core, and diverges from the base to support the rigid central core in spaced relation from the base. The rigid central core is resiliently supported by the plurality of support arms such that the rigid central core is movable towards the base when pressure is applied to the rigid central core, and the rigid central core is biased away from the base by the plurality of support arms after pressure is removed from the rigid central core. The securing means releases the optical disc when the rigid central core is forced towards the base. Preferably the plurality of support arms comprise at least three support arms spaced about the rigid central core.

In a preferred embodiment of the present invention, the plurality of support arms and the rigid central core have a selected structure and composition to provide a resistance to bending such that the resistance to bending increases as bending increases.

In another embodiment, the apparatus includes a plurality of support pegs for supporting the disc when central core is within the central aperture of the disc. Preferably, the plurality of support pegs are mounted on resilient peg support arms such that the plurality of support pegs provide resilient support to the disc.

In another embodiment, the securing means includes locking fingers for engaging the disc at the central aperture thereof and locking finger control means. The locking finger control means moves the locking fingers radially inward to release the disc and radially outward to engage the disc.

Preferably the locking fingers have a gripping surface, which contacts the inside edge of the disc at the central aperture when the locking fingers engage the disc, and which is spaced from the disc when the locking fingers release the disc.

In a further embodiment, the securing means includes locking fingers and hooks for engaging the disc at its central aperture. Each locking finger has an associated hook mounted at an upper end thereof. Each hook has an inclined contour extend radially outward such that the disc pressing against the hooks pushes the locking fingers radially inward.

BRIEF DESCRIPTION OF THE DRAWINGS

A detailed description of preferred embodiments of the invention is provided herein below with reference to the following drawings, in which.

DETAILED DESCRIPTION OF THE PREFERRED EMBODIMENT

Figure 1:
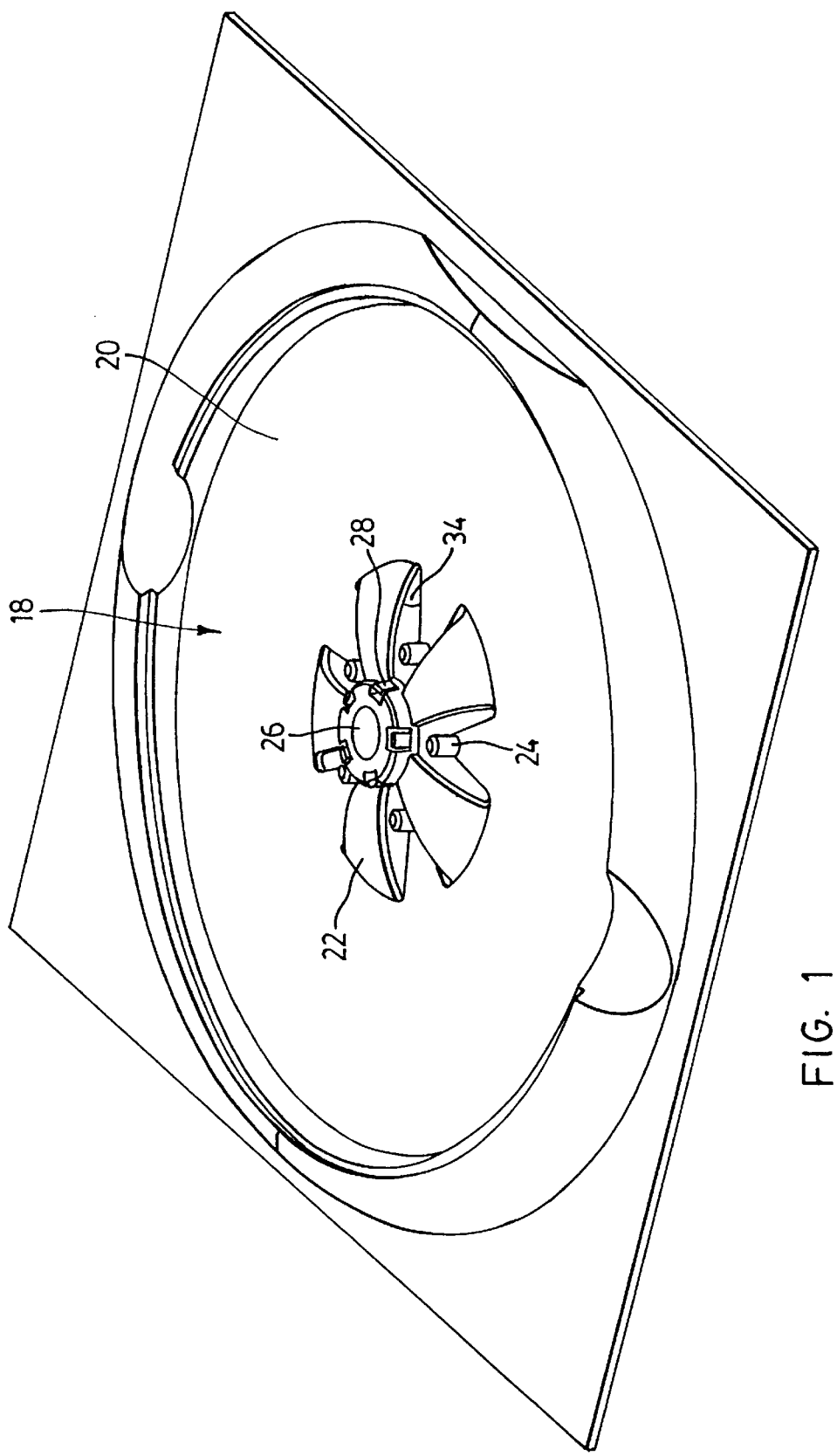
FIG. 1 is a perspective view of a portion of a disc storage case that incorporates a disc holder in accordance with a preferred embodiment of the invention.
Figure 5:
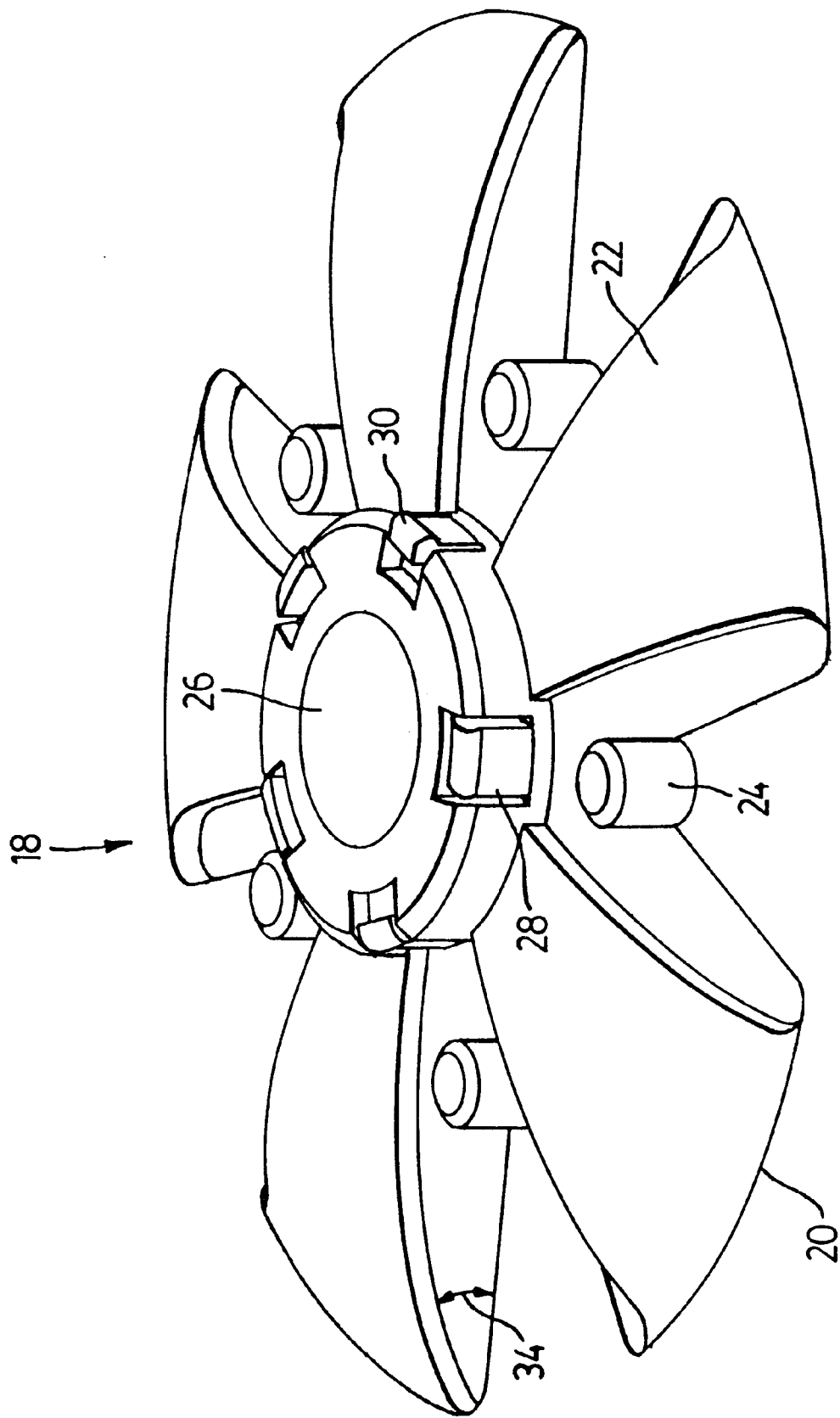
FIG. 5 is a perspective view of the disc holder of FIG. 1 shown isolated from the disc storage case.

Referring to FIG. 1 there is illustrated a part of a disc storage case incorporating a disc holder 18 in accordance with a preferred embodiment of the invention. FIG. 5 in a perspective view, shows the disc holder 18 of FIG. 1 isolated from the disc case 40. A disc storage case typically comprises a lid and a base portion, both made of a clear plastic. An edge of the lid is hinged to an adjoining edge of the base portion, but the other edges of the base portion and the lid can be readily separated in order to open the case. The lid has a disc-receiving recess that adjoins a matching disc-receiving recess in the base portion when the case is closed.

The disc holder 18 is centrally disposed in the matching disc-receiving recess of the base portion of the disc storage case, and includes a base 20 that is integral with the base portion of the disc storage case. Support arms 22 extend upwardly and inwardly from the base 20 to a central core 26. All of the support arms 22 are attached to and supported by the central core 26 at its periphery. Between the juncture of each of the support arms 22 with the central core 26, are locking fingers 28 that extend substantially upwardly from the central core 26. Each of the locking fingers 28 is accommodated within a unique one of a plurality of vertical slots 29 in the central core 26. Each of the locking fingers 28 terminates in an outwardly extending hook 30.

Central core 26 is rigid and has a raised portion to which pressure may be applied. When pressure is applied to the central core 26 at the raised point, the resulting force is evenly distributed among the support arms 22, which flex and bend at the central core 26 to permit the central core 26 to move towards the base 20. The support arms 22 diverge from the base at an angle of inclination 34. Even when no pressure is applied to the core 26 and the support arms 22 are unstressed, the angle of inclination 34 is very small as the inward directional component of the support arms 22 is much greater than their upward directional component. When the support arms 22 are stressed, the angle of inclination 34 changes by only a few degrees, and there is comparatively little bending at the core 26. The resistance of the support areas 22 to further bending varies directly which the extent to which the support arms 22 have already been bent, which aids in distributing forces applied to the core 26 equally among the support arms 22.

Figure 2:
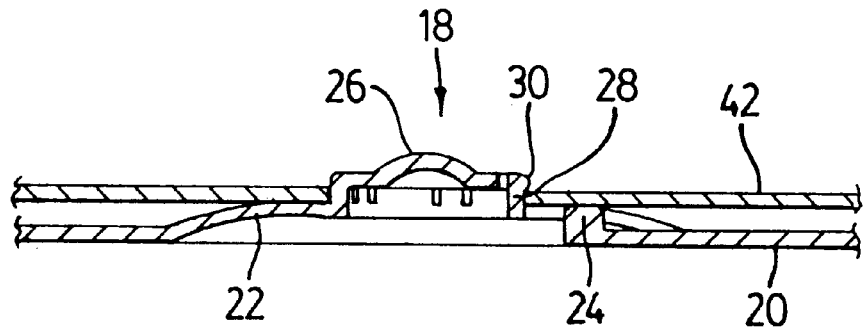
FIG. 2 in a side view illustrates the disc holder of FIG. 1 holding a disc.
Figure 3:
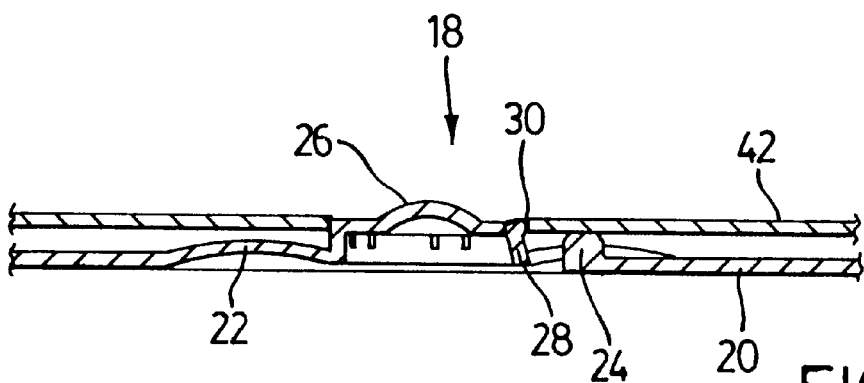
FIG. 3 in a side view illustrates the disc holder of FIG. 1 in an intermediate position between holding and releasing the disc.
Figure 4:
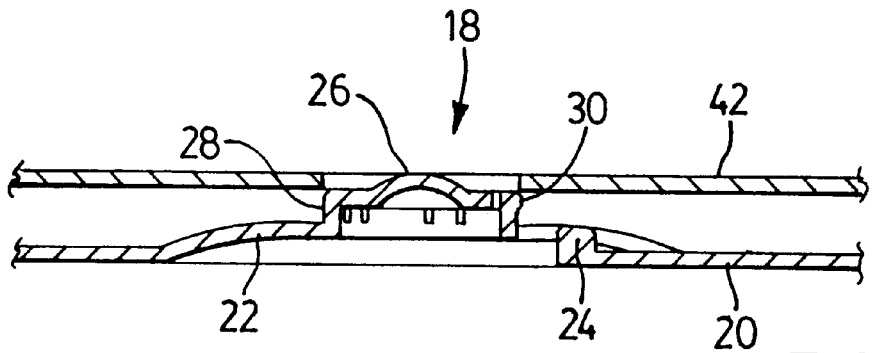
FIG. 4 in a side view illustrates the disc holder of FIG. 1 when the disc is released.

In FIGS. 2, 3 and 4, the disc holder 18 of FIG. 1 is shown with a disc 42. In FIG. 2, the disc holder 18 is shown holding the disc 42 in place. In FIG. 4, the disc holder 18, 15 shown with the disc 42 released, while in FIG. 3 the disc holder 18 is shown with the disc 42 in an intermediate position between being held and being released. Initially, a disc 42 can be received by the disc holder 18 by first placing the disc 42 in the position shown in FIG. 4. In this position, disc 42 is supported above the central core 26 by the fingers 28 and hooks 30. Pressure is then applied to the disc 42 to push the disc 42 down onto the hooks 30. The hooks 30 have a semi-circular contour that redirects the downward pressure on the disc 42 as a radially inward pressure on the locking fingers 28, which moves the locking fingers 28 radially inward into the slots 29, and out of the way of the disc 42. As a result of the locking fingers 28 moving inwardly into the slots 29, the hooks 30 no longer support the disc 42 and the disc 42 slides down, receiving the central core 26 through the central aperture. The disc 42 is then supported by support pegs 24. After the disc 42 is in place about the central core 26, and the pressure is received, the resilience of the locking fingers 28 moves them outwardly out of their inward orientation and the hooks 30 engage with the face of the disc 42 that is opposite to the face that is supported by the support pegs 24. The disc is then supported against movement perpendicular to the plane of the disc 42 by the hooks 30 and the support pegs 24. The central core 26 extending through the central aperture restrains the disc 42 from movement parallel to the plane of the disc 42.

Central core 26 is rigid and has a raised portion to which pressure may be applied. When pressure is applied to the central core, the locking fingers 28 are pressed downwardly, and the hooks 30 are pushed against the disc 42. Due to the semi-circular contour of the hooks 30, the force exerted on hooks 30 by the disc 42 is redirected radially inward to push the locking fingers 28 into the slots 29 and out of the way of the disc 42 so that the disc 42 can be taken off of the central core 26.

Figure 6:
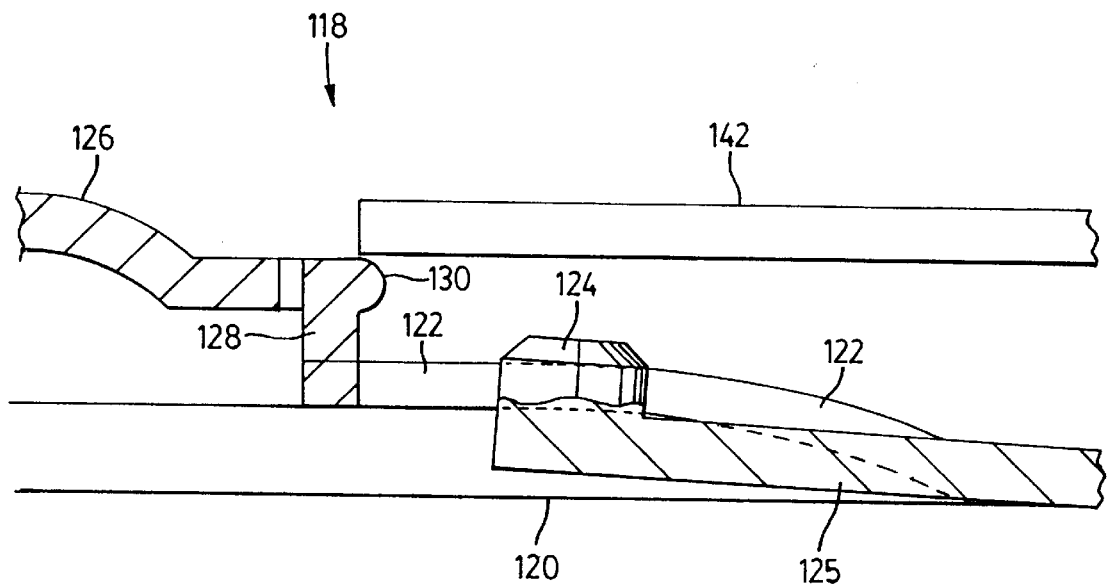
FIG. 6 is a partial side view of a disc holder in accordance with a further preferred embodiment of the invention together with a disc released by the disc holder; and, FIG. 7 in a partial side view illustrates the disc holder of FIG. 6 holding a disc.

Referring to FIG. 6, there is illustrated in a side view, a disc holder 118 in accordance with a further preferred embodiment of the invention. The disc holder 118 is shown with a disc 142 that is on top of, but is not held by, the disc holder 118. Similar to the preferred embodiment of the invention shown in FIGS. 1 through 5, support arms 122 extend upwardly and inwardly from a base 120 to a central core 126. All of the support arms 122 are attached to the central core 126. Between the juncture of each of the support arms 122 with the central core 126, are locking fingers 128 that extend substantially upwardly from the central core 126. Each of the locking fingers 128 terminates in an outwardly extending hook 130. The disc 142 is impeded from sliding down around the central core 126 by the locking fingers 128 and the hooks 130, which initially do not fit through the central aperture of the disc 142.

Figure 7:
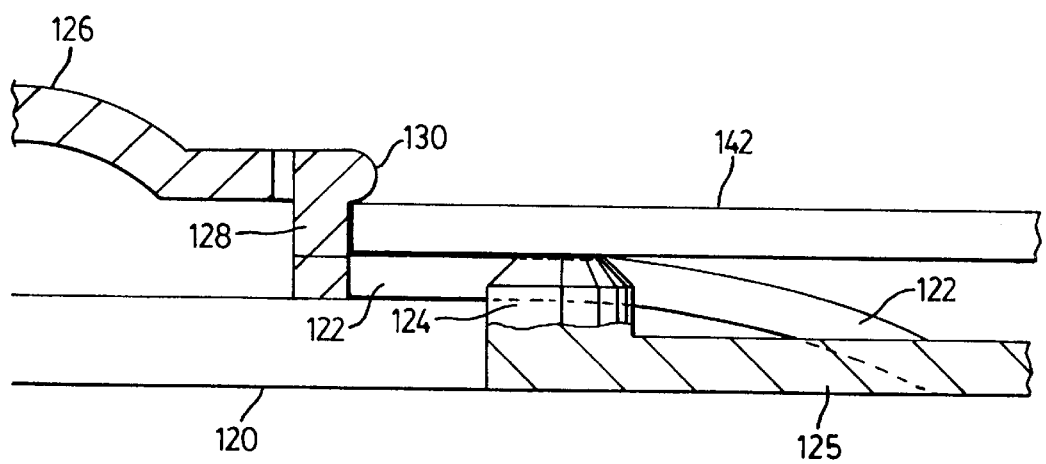

When pressure is applied to the disc 142, the resulting force is distributed between the hooks 130. Due to the semi-circular contour of the hooks 130, this force is redirected radially inward to push the locking fingers 128 into the slots 129 and out of the way of the disc 142 so that the disc 142 can slide down around the central core 126. The disc 42 is then supported by support pegs 124 that are themselves supported by peg support arms 125. The peg support arms 125 extend upwardly from the base 120 and are resilient. When the pressure is taken off, the fingers 128 resume their relaxed orientation in which the hooks 30 press against the face of the disc 142 that is opposite to the face supported by the support pegs 124. FIG. 7 shows, in a side view, the disc holder 118 holding a disc 142. This disc is resiliently retained on one side by the support pegs 124 mounted on resilient peg support arms 125, and on the other side by the hooks 130.

Central core 126 is rigid and has a raised portion to which pressure may be applied. When pressure is applied to the central core, the locking fingers 128 are pressed downwardly, and the hooks 130 are pushed against the disc 142. Due to the semi-circular contour of the hooks 130, the force exerted on hooks 130 by the disc 142 is redirected radially inward to push the locking fingers 128 into the slots 129 and out of the way of the disc 142 so that the disc 142 can slide off of the central core 126.

Other variations and modifications are possible. In particular, instead of the locking fingers and hooks discussed above, only fingers might be used to provide a friction grip on the disc. Further, instead of a seam that twists in response to a downward force on the central core in order to give the locking fingers a more inward orientation, alternative means could be used to move the locking fingers inwardly when pressure is applied to the central core. All such modifications or variations are believed to be within the scope of the invention as defined by the claims appended hereto.

What is claimed is:

1. An apparatus for releasably securing an optical disc having a central aperture, the apparatus comprising:
    a base;
    a rigid central core dimensioned to fit within the central aperture of the optical disc, said rigid central core being spaced from said base;
    a plurality of inwardly extending support arms for supporting said rigid central core, each of said plurality of support arms
        (a) having an associated outer end attached to the base,
        (b) an associated inner end fixed to the rigid central core, and
        (c) diverging from said base to support said rigid central core in spaced relation from said base,
    wherein said rigid central core is resiliently supported by said plurality of support arms such that said rigid central core is movable towards said base when pressure is applied to said rigid central core, and said rigid central core is biased away from said base by said plurality of support arms after pressure is removed from said rigid central core;
    securing means for releasably securing the rigid central core within the central aperture of the optical disc, said securing means being disengaged when said rigid central core is forced towards said base to release said optical disc;
    wherein said rigid central core is non-deformable to evenly distribute a force among said support arms.

2. The apparatus as defined in claim 1 further comprising a plurality of support pegs for supporting the disc when said central core is within the central aperture of the disc.

3. The apparatus as defined in claim 2 wherein said plurality of support pegs are mounted on resilient peg support arms such that said plurality of support pegs provide resilient support to the disc.

4. The apparatus as defined in claim 1 wherein said plurality of support arms comprise at least three support arms spaced about said rigid central core.

5. The apparatus as defined in claim 1 wherein said securing means comprises
    a plurality of locking fingers for engaging the disc at the central aperture thereof, the plurality of locking fingers being mounted on the rigid central core and being bendable radially inward to release the disc and radially outward to engage the disc.

6. The apparatus as defined in claim 5 wherein said plurality of locking fingers have a gripping surface, said gripping surface
    contacting the disc at the central aperture thereof when said plurality of locking fingers engage the disc, and
    being spaced from the disc when said plurality of locking fingers release the disc.

7. The apparatus as defined in claim 5 wherein each locking finger in the plurality of locking fingers is mounted on the central core at a fixed end of the locking finger and is free at a free end opposite to the fixed end, each locking finger in the plurality of locking fingers being bendable about the fixed end to move the free end radially inward to release the disc and radially outward to engage the disc.

8. The apparatus as defined in claim 7 wherein each locking finger has a hook mounted thereon for engaging the disk at the central aperture thereof, the hook having an inclined contour extending radially outward from the corresponding finger such that the disc pressing against the hook is operable to push the hook and the locking finger radially inward.

* * * * *